United States Patent [19]

Shirasaki

[11] Patent Number: 5,148,075
[45] Date of Patent: Sep. 15, 1992

[54] VIBRATION WAVE DRIVEN MOTOR

[75] Inventor: Takayuki Shirasaki, Yokohama, Japan

[73] Assignee: Canon Kabushiki Kaisha, Tokyo, Japan

[21] Appl. No.: 676,369

[22] Filed: Mar. 28, 1991

[30] Foreign Application Priority Data

Mar. 28, 1990 [JP] Japan .................................. 2-79686

[51] Int. Cl.$^5$ .......................................... H01L 41/08
[52] U.S. Cl. .................................................. 310/323
[58] Field of Search ................................ 310/323, 328

[56] References Cited

U.S. PATENT DOCUMENTS

| 4,736,129 | 4/1988 | Endo et al. | 310/323 |
| 5,034,646 | 7/1991 | Shirasaki | 310/323 |

FOREIGN PATENT DOCUMENTS

| 0053182 | 3/1987 | Japan | 310/323 |
| 0053184 | 3/1987 | Japan | 310/323 |
| 0107687 | 5/1987 | Japan | 310/323 |
| 0118779 | 5/1987 | Japan | 310/323 |

OTHER PUBLICATIONS

American National Standard, "Standard Test Method for Rockwell Hardness of Plastic and Electrical Insulating Materials", ANSI/ASTM D 785-65, pp. 315-320.
American National Standard, "Standard Test Method for Rubber Property-Durometer Hardness", ANSI/ASTM D 2240-75, pp. 705-708.

Primary Examiner—Mark O. Budd
Attorney, Agent, or Firm—Fitzpatrick, Cella, Harper & Scinto

[57] ABSTRACT

A vibration wave driven motor includes a vibration member for generating a vibration wave in response to an applied signal. A contact member includes a contact element which contacts the vibration member. The vibration wave creates relative movement between the vibration member and the contact member, and the surface of the contact member is made of a non-fiber type compound resin having a Rockwell hardness of 80-110 while the vibration member is made of a stainless steel of precipitation.

10 Claims, 2 Drawing Sheets

VIBRATION WAVE DRIVEN MOTOR

BACKGROUND OF THE INVENTION

1. Field of the Invention

This invention relates to a vibration wave driven motor, more specifically an ultrasonic motor having large output, wherein a traveling vibration wave is produced by impressing applying an electric voltage over electro-mechanical energy conversion elements. The traveling vibration wave thus produced creates frictional driving between the vibrating body and a member that contacts the vibrating body, thereby producing relative movement.

2. Related Background Art

With a vibration wave driven motor of the prior art, especially of the large output type an array of piezoelectric elements arranged in a thin ring is fixed on a circular vibrating body base made of, for example, stainless steel. The surface of said the vibrating body base is thermally sprayed and deposited with ultra hard materials consisting of tungsten carbide and cobalt. The same surface is then finished by grinding to make a rigid sliding surface, thus constituting a vibrating body. In order to constitute a member that contacts the vibrating body, on the other hand, a supporting body made of, for example, aluminum alloy is used. Adhered to this supporting body are reinforced compound resin layers, wherein reinforcement materials such as carbon fiber are filled and mixed in the thermoplastic resins having a transition temperature to glass higher than 100° C. including polyimide (PI), polyamideimide (PAI), polyetherimide (PEI), polyether etherketone (PEEK), polyether sulfone (PES), polyarylate (PAR), polysulfone (PSF), and heat resisting resins such as aromatic polyester of crystalline liquid (LCP), and the thermosetting aromatic polyimide (PI). A member processed this way makes a rigid sliding body. Such vibrating body and the contacting member are arranged so as to make relative movement by the frictional driving created by the traveling vibration wave that is produced in the vibrating body.

To create the relative movement mentioned above, either of the contacting member and the vibrating body can be arranged fixedly or movably. In the explanations hereinbelow in this specification, it is assumed that the vibrating body is fixedly arranged while the contacting member is set movable in order to make explanations simple. Consequently, the member that contacts the vibrating body is called "a movable body".

With the conventional vibration wave driven motor mentioned above, the reinforced thermoplastic resin having a transition temperature to glass higher than 100° C. and the sliding body using thermosetting aromatic polyimide resin as the matrix are used for the reason that their physical property characteristics show a small degree of dependence on ambient temperature. Even when the temperature rises as a motor is being driven, the phenomenon of the torque drop due to softening of resin materials can be neglected, thus allowing the stable accuracy of the motor to be maintained.

Moreover, reinforcement materials such as carbon fiber are mixed and filled inside the above mentioned resin materials for the following reasons: (1) to maintain the stability of the sliding surface conditions of a movable body against the sliding surface of a vibrating body made of ultra hard materials of tungsten carbide and cobalt, and at the same time to guarantee enough wear resistance in the driving of long hours; (2) to improve a motor in its performance such as its output, by increasing the physical property values including elastic modulus or hardness of a sliding body; and (3) to improve a motor in its performance, such as its efficiency, and others points by enhancing the thermal conduction of the sliding body.

As described above, the use of the reinforcement type compound resin (wherein carbon fiber is filled in the heat resisting thermoplastic resin having a transition temperature point to glass higher than 100° C. as well as the thermosetting polyimide resin) together with a sliding body (that constitutes a sliding surface for a movable body in the vibration wave driven motor) can stabilize the performance as well as the accuracy of a motor when temperature rises with a motor being driven. It also can provide the carbide materials forming a sliding surface of a sliding body with enough abrasion resistance for long hours of driving and further enables the motor performance such as its output efficiency to be enhanced to higher values.

With the sliding surface, however, of the above-mentioned carbon fiber reinforced compound resin layers (composed of the heat resisting thermoplastic resin and thermosetting aromatic polyimide resin) of a movable body and the surface pressed to and contacted with the rigid sliding surface composed of carbide materials of a vibrating body, a rated operation condition of 4 kg/cm, 100 rpm was used to start driving, and about 5% torque fluctuation in the rated torques value was observed. Accordingly, further improvements are desirable.

When driving was conducted over a long period of 1,000 hours under a comparatively high output condition of the rating, it was found that even the carbon-fiber reinforced compound resin wore was worn by more than 3 micron meters ($\mu m$). This suggests that further improvements of the abrasion resisting materials are desirable.

SUMMARY OF THE INVENTION

One aspect of this invention is to provide a vibration wave driven motor that can insure small torque fluctuations as well as minimal possibility of scratches and dents that may happen on the friction surface of a vibrating body.

Another aspect of this invention is to provide a vibration wave driven motor of large output that is both inexpensive as well as producible in mass production.

Other aspect of this invention will become apparent in the course of the explanations to be given hereinbelow.

In aspect of this, invention, a vibration wave driven motor includes a vibrating body generating traveling vibration waves press contacted against a movable body having compound resin layers, thus providing a contact surface with said vibrating body, and the vibrating body and the movable body together make relative movements by frictional driving produced by traveling vibration waves that are created in the vibrating body. With this particular vibration wave driven motor, the compound resin layers mentioned above are constituted by the compound resin having a Rockwell hardness ($H_RM$) of 80 to 110 wherein the matrix of both thermoplastic resin having a transition temperature to glass higher than 100° C. and the thermosetting aromatic polyimide resin are filled and mixed with friction adjusting agents or, if necessary, non-fiber type improvement agents for abrasion resistance. Adopted with the vibrating body that contacts the movable body, on the other hand, is the precipitation hardening stainless steel having the most superior corrosion resistance of the martensite stainless steels, a coefficient of thermal expansion of about $10.6 \times 10^{-6} \deg^{-1}$ in normal temperature, and a Rockwell hardness ($H_RC$) of 35 or 44.

In another aspect of this invention, the compound resin is composed of a matrix resin of thermoplastic resin or thermosetting aromatic polyimide resin having extra-high heat resistance, larger elastic modulus of bending, high hardness, and a transition temperature to glass higher than 100° C. This matrix resin is filled with friction adjusting agents including such solid lubrication agents as fluoride resin lead monoxide, amorphous graphite, and further if necessary, abrasion improvement agents of non fiber reinforcement materials such as spherical graphite, metal molybdenum powder, calcium carbonate.

With the above mentioned friction adjusting agents, it is recommended as especially preferable that the lead compound such as lead monoxide with the weight ratio less than 30% to the matrix and the fluoro resin such as ethylene tetrafluoride with the weight ratio of 5-40% to the matrix are added simultaneously.

Due to the low friction coefficient of the tetrafluoric ethylene resin mentioned above, an excessive amount of filling of the resin causes the friction coefficient to become smaller, thus causing both the material strength and abrasion resistance to deteriorate. The aforementioned range of appropriate filling ratio is suggested considering the effect by the amount of filling. The above mentioned lead monoxide powder and tetrafluoric ethylene resin powder are effective means for supplementing the lubricating ability of the thermoplastic resin or the thermosetting resin of solid lubricating agents as the matrix. When a sliding surface of the compound resin layers is friction driven along the sliding surface of a vibrating body, the lead monoxide powder acts on the film of tetrafluoric ethylene resin in a way that the film is transposed onto the sliding surface of the vibrating body. The lead monoxide powder and the tetrafluoric ethylene resin are useful materials in order to keep the friction coefficient constant, especially with the sliding being performed under high temperature.

The average grain size of the powder of the lead compound including the lead-monoxide lead powder, or the fluoride resin including the tetrafluoric ethylene resin, both to be used as lubricating agents, should be preferably less than 20 μm, which should guarantee the abrasion resistance and the material strength of the compound resin layers with further consideration to the adhesion with the thermoplastic resin or the thermosetting aromatic polyimide resin of the matrix. Due to the low friction coefficient of the tetrafluoric ethylene resin (PTFE), the friction coefficient becomes smaller as the amount of filling increases, thus causing both the material strength and the abrasion resistance to deteriorate.

In response to the requirements to improve abrasion resistance and to maintain the stability of a sliding surface against changing temperatures, transition metal powder can be used to be filled and mixed in the compound resin layers mentioned above. Such transition metal powder include tungsten, molybdenum, chrome, cobalt, titanium, and nickel. Such a case can be exemplified as using at least one of those quoted where tungsten powder (less than 10 μm) is used in the weight ratio less than 40%, or molybdenum powder (less than 5 μm) in the weight ratio less than 15% both to the matrix.

Furthermore, non-fiber type improvement agents for abrasion resistance can be filled in the above mentioned compound resin layers if necessary. As such non-fiber type improvement agents for abrasion resistance, we can refer to one type of graphite, for example, that is the phenol resin heat-treated at around 1000° C. having amorphous and unoriented grains of spherical form in the average grain size of 10-30 μm. One case can be mentioned as especially preferable of the spherical form graphite that is filled and mixed in the weight ratio of 5-40% to the matrix. Such abrasion resisting fillers are effective means for the reasons:

1. The stability can always be maintained of the sliding surface conditions of a movable body when a vibrating body is used as a sliding surface to ultra hard materials. In addition, enough abrasion resistance can be insured during the driving of long hours.

2. The value of physical property characteristics including elastic modulus can increase of for the sliding surface of a movable body and at the same time, the motor performance can improve as to its output.

3. The thermal condition of the compound resin layers can improve, thus upgrading efficiency and other points of the motor performance.

Furthermore as the improvement agents for abrasion resistance, reinforcement materials of powder having lower hardness than the metal molybdenum powder or spherical graphite mentioned above can also be used as fillers. Those include calcium carbonate, magnesium carbonate and antimony trioxides. In this case, the amount of filling should be less than 20% in the weight ratio to the matrix.

The thermoplastic resin having high heat resistance is used as the matrix resin material for the compound resin layers, namely the resin having a transition temperature to glass higher than 100° C. or a transition temperature to glass of 100° C.-280° C. for general use or preferably a transition temperature to glass of 250° C.-280° C.

Such thermoplastic risins as quoted above include polyimide (PI), polyamideimide (PAI), polyetherimide (PEI), polyester etherketone (PEEK), polyester sulfone (PFS), polyarylate (PAR), polysulfone (PSF), aromatic polyester of crystalline liquid (LCP). More practically, the polyimide (PI) is the most preferable. The thermoplastic polyimide of this type is available by the product name "TPI" (Product name: made by Mitsui Toatsu Chemicals, Inc.), which has extra high heat resistance of the transition point to glass of 250° C. and the melting point 382° C. of the thermoplastic resins.

As another type of base resin material for the compound resin layers, there is provided a thermosetting aromatic polyimide resin. The aromatic polyimide resin is one of the thermosetting type resins and representative products include the condensation product of biphenyl tetracarboxylic acid dianhydride and aromatic diamines ("Ubilex" Product name: made by Ube Industries, Ltd.), and the condensation product of the pyromellitic acid anhydride and diaminodiphenylether ("Bespul" Product name: made by Dupont). These condensation products show high temperature characteristics much superior to any product in the wide range of plastics. The temperature of thermal distortion, for example, is 350° C. by the load weight 18.8 kg/cm². Even in the environments of continuous usage at the temperature 260° C., the level of the strength existent with the general use engineering plastics in normal temperature can be maintained.

If the non-fiber type sliding materials of compound resin mentioned above are combined with a vibrating body that is thermally sprayed and deposited with the conventional tungsten carbide and cobalt, the hardness of a friction surface of the vibrating body exceeds a of Vickers hardness, of 1,000 thus facilitating the wear of the compound resin. In view of this fact, a stainless steel of precipitation hardness type (JIS SUS 630) having a Rockwell hardness ($H_RC$) of 35-44 was adopted with one Embodiment of this invention.

Since this stainless steel of precipitation hardening type has the best corrosion resistance of all the martensite stainless steels, it becomes possible to minimize the difference in the thermal expansion coefficients between the vibrating body and the piezo-electric element of this disc form glued and fixed on the back of the vibrating body, whereby there is provided a clear advantage in view of the possible stripping or breakage of the piezoelectric element when heat generation intensifies with the element charged with electricity.

Considering that the stainless steel (JIS SUS 630) of precipitation hardening type has the chemical composition of about 17% of chrome and about 4% of nickel (Ni), and the maximum hardness of the material after solution treatment is 38 in the Rockwell ($H_RC$), it is appreciated that the machining of this material is quite easy.

When further processing of precipitation hardening heat treatment is done on the vibrating body that already underwent machining, the Rockwell hardness ($H_RC$) becomes 44 by H900 heat treatment (a heat treatment method of heating by 470° C.-490° C. for 1 to 2 hours and then air cooling) and 36 by H1025 treatment (a heat treatment method of heating by 540° C.-560° C. for 4 hours and then air-cooling).

When the material of the vibrating body as described above is turned to a precipitation hardening type stainless steel, the hardness of the friction surface becomes 35-44 in the Rockwell hardness ($H_RC$), which is equivalent to about 340-440 of the Vickers hardness (Hv).

As the value is considerably lower than the Vickers hardness 1,000 of tungsten carbide and cobalt, it becomes possible to reduce the frictional wear of the counterpart, the non-fiber type compound resin.

DETAILED DESCRIPTION OF THE PREFERRED EMBODIMENTS

Explanations are given herein as to the Embodiments of this invention, which are shown in the Figures.

Figure 1:
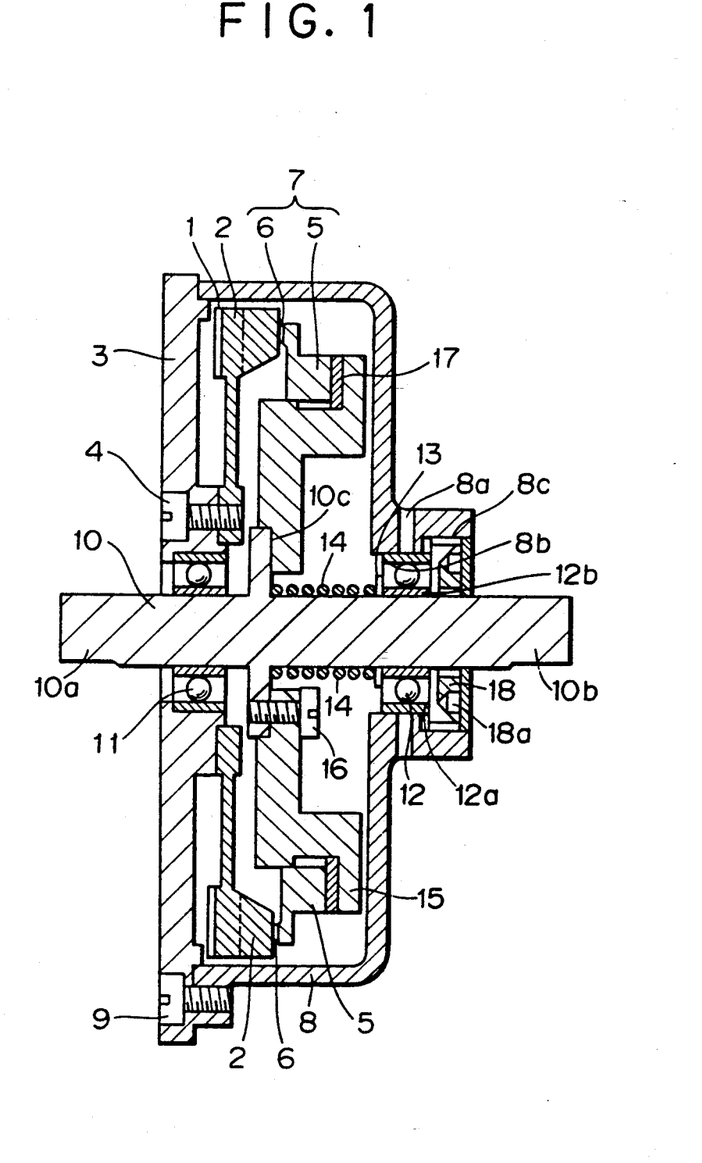
FIG. 1 is a cross sectional view illustrating a structure outline of a vibrating wave driven motor that can be constituted by applying this invention.

FIG. 1 is a cross sectional view showing, one Embodiment of a vibrating motor including the present invention.

In this Figure, 2 is a vibrating base of circular form that is made up of metal members including stainless steel. On the back, an array of piezo-electric elements 1 of a thin ring is fixed using the heat resisting adhesive of epoxy resin in the position concentric to the circular base. The sliding surface of the vibrating body base on its front face is provided with a number of grooves running toward the circumference of the base from the center of the axis (like comb teeth), which aim at maximizing vibration width of the travelling vibration wave. 3 is a box made of a metal material of high thermal conduction. In the center of the box, the first ball bearing 11 is set. The above-mentioned vibrating body 2 is fixed by a screw 4 in concentric relationship with the axis center of the first ball bearing 11.

10 is an output axis having a flange part 10c in the middle. One end 10a of the axis is trusted throughout and supported by the inner ring of the first ball bearing 11 mentioned above in such a manner that it can slide along said axis. The other end 10b is trusted throughout both the inner ring of the second ball bearing 12 and the axis hold of the spring pressure adjusting nut part 18 (both to be explained later) in such a manner that it can both slide and rotate along the axis. 15 is an intermediate member of disc from, which is fixed with a screw 16 at the flange part 10c of the output axis mentioned above. To the periphery of the casing of the intermediate member, a movable body 7 formed in a circular ring is joint fitted in a concentric relationship.

The movable body 7 mentioned above is composed of supporting body 5 made of a metal having high thermal conduction such as aluminum alloy, and a sliding body 6 adhered to the surface of the supporting body in a concentric relationship using a heat resisting epoxy adhesive. Supporting body 6 is constituted by the compound resin layers having both the composition and structure to be explained and referred to later as a circular body of thickness 1 mm. This sliding body 6 contacts the sliding surface of the vibrating body 2.

The movable body 7 is arranged such that it is supported by the intermediate member 15 via the member of elastic rubber sheet 17, which is set at the base of the movable body 7. Compression spring member 14 in coil form, which is set between the flange 10c of the above-mentioned output axis 10 and the above-mentioned second ball bearing 12, generates an axial load that produces the directional force along the axis of the supporting body 5 via the elastic sheet member 17, whereby the sliding surface of the vibrating body 2 is pressed to and contacts with the sliding body of the movable body 7.

8 is a covering for the casing of the vibration wave driven motor. It is fixed to the box 3 with a screw 9. The second ball bearing 12 is set in the ball bearing hole 8b located in the center of the box 3 in the manner that it can slide along the axis direction. Further in the inner face adjacent to the ball bearing hole 8b, there is a screw part 8c where a spring pressure adjusting nut member 18 is screwed in. The spring pressure adjusting nut part member 18 contacts only the outer ring 12a of the second ball bearing 12. The inner ring 12b of the second ball bearing 12 is fixed to the output axis 10 in the manner that it can slide in the axis direction and also can rotate. By inserting two insertion sticks of a jig (not shown in the Figures) into two small holes 18a, 18a made in the spring pressure adjusting nut member 18 and turning them clockwise, this spring pressure adjusting nut member 18 moves toward the left direction in FIG. 1 while the second ball bearing 12 is pushed toward the same direction and compresses the compression spring, thus increasing the tension of the spring. Turning the sticks to the opposite direction expands the compression spring member 14 and lowers the spring's tension. Thus it is assumed possible to adjust the axial load on the output axis 10 by means of the spring flexure. The outer ring 12a of the second ball bearing 12 is usually secured to the box cover 8 by pouring adhesive through the small hole 8a in the box cover 8 after the axial load adjustment is completed for the output axis 10.

Between one end of the compression spring member 14 and the second ball bearing 12, a spacer 13 is mounted that contacts only the inner ring 12b of the second ball bearing 12. One end of the compression spring member 14 contacts the spacer 13, thereby, allowing the output axis to rotate smoothly. A spring having a small spring constant is preferred as the compression spring member 14 in order to reduce fluctuations of the axial load due to the spring flexure.

Figure 2:
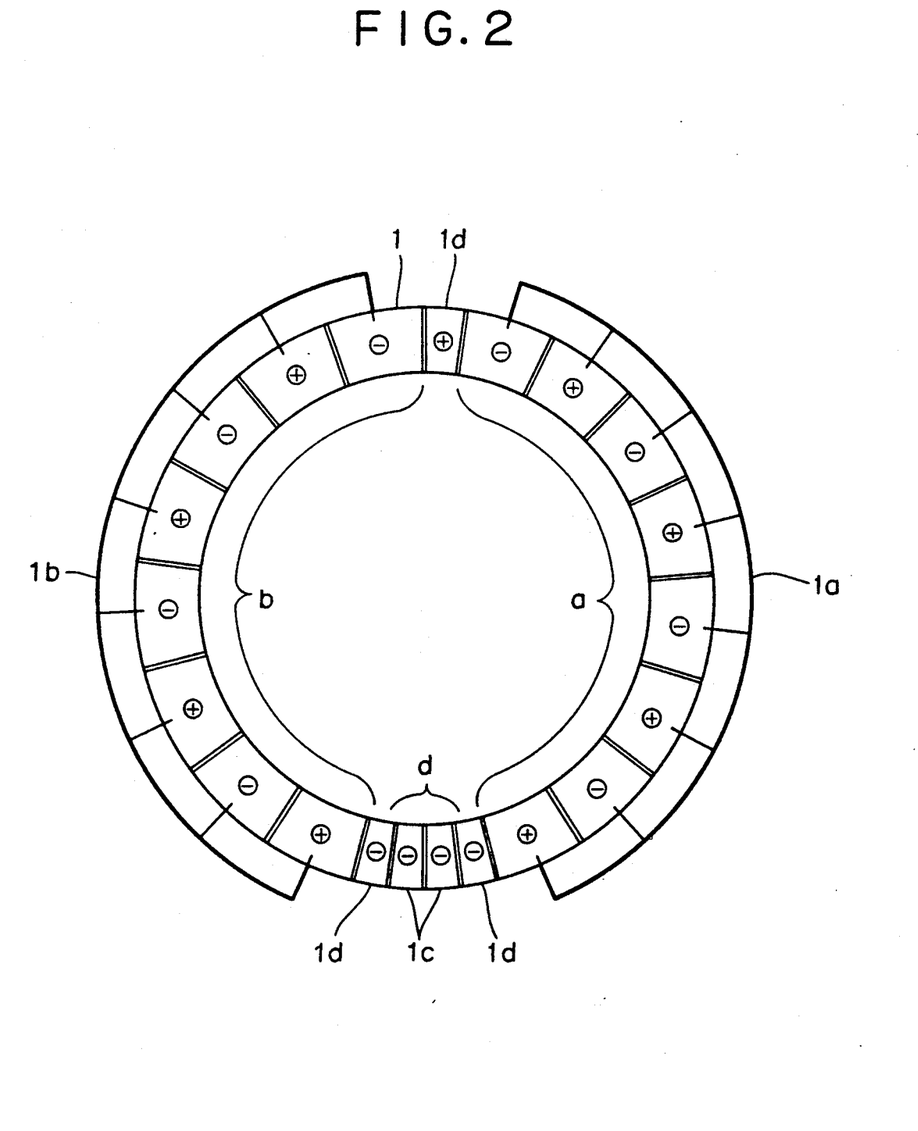
FIG. 2 is a top view illustrating the position of an array for piezo-electric elements that constitute the vibrating body.

The above-mentioned array of piezo-electric elements of the vibrating body 2 is composed of, in the direction of thickness and as illustrated in FIG. 2, (1) A array of piezo-electric elements 1a (2) B array of piezo-electric elements 1b, both of which are used for driving and are polarized as shown in the Figure, (3) two pieces of piezoelectric elements 1c for vibration detection, and (4) a common electrode 1d for earth connection. The B array of piezo-electric elements is positioned off set by a ¼ pitch of the vibrating wavelength (λ) to be excited in deviation to the A array of piezo-electric elements 1a.

As the A array of piezo-electric elements 1a and the B array of piezo-electric elements are impressed with the cyclic voltage having a phase difference of 90°, a traveling vibration wave is created on the surface of the vibrating body 2 in the method which is widely understood and acknowledged. The movable body 7 pressed to the vibrating body 2 as mentioned above moves by the frictional driving, which is further transferred via the intermediate member 15 and rotates the output axis 10.

With the vibration wave driven motor (ultrasonic motor) so far described, a ring having the outside diameter 68 mm, the inside diameter 64 mm the thickness 1 mm was used for the sliding body which was made of the composition shown in Chart 1 below with an eye to further evaluate the material of the sliding body 6, which was composed of the compound resin layers of the movable body 7. The ring was glued and fixed to a circular supporting body 5 of aluminum alloy, using epoxy adhesive agent.

The sliding body in the present Embodiment, by the way, was the compound resting as shown below, wherein the thermosetting polyimide (PI) or the thermoplastic resin having a transition temperature to glass higher than 100° C. as the matrix materials was mixed with the non-fiber type fillers which were described in Chart 1.

Embodiment 1: In order to constitute a matrix material, a thermosetting aromatic polyimide resin (which is a conversation product of biphenyl tetracarboxylic acid dianhydride and aromatic diamines. (Product name: Ubilex made by Ube Industries, Ltd.), was filled and mixed with the tetrafluoric ethylene resin powder as a non-fiber type filler (PTFE average grain size of 9 μm) in the weight ratio of 8.5% and monoxide lead powder (PbO) (average grain size 10 μm) in the weight ratio of 6.0%. The matrix mixed as described above was compressed, formed and cut to make a ringed sliding body of 1 mm.

Embodiment 2: The filling amount of the tetrafluoric ethylene resin powder (PTFE) was 9.4% this time. In addition, the molybdenum powder (MO) as the non-fiber type filler was filled and mixed in the weight ratio of 6.5%. Other conditions were the same with the Embodiment 1 to make a sliding body.

Embodiment 3: The thermoplastic polyimide (Product name: PI made by Mitsui Toatsu Chemicals, Inc.) was filled with the tetrafluoric ethylene resin powder (PTFE) in the weight ratio of 3.0%. Furthermore, the graphite in spherical form was added in the weight ratio of 12%. The material made this way was formed by injection molding, and cut to make a ringed sliding body of 1 mm.

Embodiment 4: The tetrafluoric ethylene resin powder (PTFE) was filled in the weight ratio of 7.0% and powder of calcium carbonate ($CaCO_3$) was further filled and mixed in the ratio of 10.0%. Other conditions were the same with the Embodiment 3 to make a sliding body.

As a comparative case, the thermosetting aromatic polyimide resin (PI) was filled and mixed with the carbon fiber (CF) as the abration improvement agent in the weight ratio of 15% and the same ringed sliding part as mentioned in the above Embodiments was prepared.

Chart 1 shows the transition point to glass, the elastic modulus of bending and Rockwell hardness ($H_RM$) of the compound resin evaluated.

The values of the transition point to glass are quoted from the catalog of a resin manufacturer. The elastic modulus of bending and the Rockwell hardness are obtained from the measurement conducted in accordance with the method described below of the test pieces we made.

Measurement of the elastic modulus of bending:
A plate of thickness 13.2 mm was used on the basis of the ASTMD 792.

Measurement of the Rockwell hardness: based on the ASTMD 785.

The thermal characteristics as shown in Chart 1 for the compound resin show that the aromatic polyimide is thermosetting, and nothing equivalent to a transition point of glass exists.

As the transition point of the thermoplastic polyimides is 250° C., it becomes apparent that all the compound resins used in the Embodiments including aromatic polyimides have the capability of extra high heat resistance.

The carbon fiber, with the present comparative case, was filled and mixed as the reinforcement material in order to improve abrasion resistance, lubricating performance as well as thermal conduction, whereby the elastic modulus of bending was considerably improved and at the same time the highest value of the Rockwell hardness was obtained as shown in the Chart.

With the compound resin of thermosetting polyamide in the Embodiments 1 and 2, tetrafluoric ethylene resin powder and others were filled and mixed as the abrasion adjusting agents, thereby producing lower values of elastic modulus of bending as well as of hardness than the conventional matrix resin.

The compound resin of thermoplastic polyimide in the Embodiments 3 and 4 was filled and mixed with the fillers of graphite in spherical form or the calcium carbonate in addition to the tetrafluoric ethylene resin. This caused the elastic modulus of bending to become greater than that of the conventional matrix resin and the hardness to become smaller. The hardness of the thermosetting polyimide was improved by annealing and crystallization, which equally improved the Rockwell hardness in the Embodiment 3 and 4 to 101 and 106 respectively.

Chart 2 shows the martensite stainless steel of a vibrating body hardening of the same, and the hardness that was measured by a Vickers durometer.

Shown in the comparative case 1 and the Embodiment 1 is a vibrating body of 13% chrome steel (JIS SUS 420J2). With the comparative case 1, the Vickers hardness (Hv) shows the lowest of around 220 because the hardening process was omitted. With the case for the comparative case 2 and the Embodiment 1, the Vickers hardness (Hv) is around 530 by hardening and tempering. The comparative case 2 shows one conventional example where the thermal spraying of tungsten carbide and cobalt are further performed, producing the film thickness of less than 100 μm and a Vickers hardness (Hv) of more than 1,000.

Used in the Embodiments 2 and 3 is a vibrating body using a stainless steel of the precipitation hardening type of 17% chrome. (JIS SUS 630 Product Name: PSL made by Hitachi Metals Ltd.) In the Embodiment 2, vibrating body is used as it is cut out of the material processed by solution treatment (A processing). Its hardness is around 380 by the Vickers hardness (Hv). In the Embodiment 3, heat treatment of precipitation hardening is further done after the machining (H900 processing), thus improving the Vickers hardness (Hv) to around 420 and at the same time stabilizing the material characteristics.

Because of the thin film thickness of the tungsten carbide (less than 100 μm) in the case of the comparative case 2, the load of the durometer was reduced to as small as 50 gf for measuring.

As seen from the results of measurements in Chart 1, it is confirmed that there exists a considerable difference in the hardness; the hardness in the case of the comparative case 2 is more than 1,000 (Hv), while the hardness shown in Chart 2 for the Embodiments 1, 2 and 3 are less than half of the 1,000. It is further confirmed that the hardness in Chart 2 of the comparative case 1 is still lower.

A vibrating body 2 was constituted as a circular body having the diameter 73 mm and the length of 7 mm in the axial direction.

Chart 3 shows a vibration wave driven motor of large output type that is constituted by combining the vibrating body of the compound resin in Chart 1 and the vibrating body in Chart 2 in the structure shown in FIG. 1, and the evaluation results of the motor.

Items of the evaluation include an output rating and a maximum efficiency in addition to the initial wear and the torque fluctuations of both the vibrating body and the compound resins.

Initial wear : After operating by the rating (4 kg/cm, 100 rpm) for continuous 100 hours, the scratches and the wear amount were measured for the friction surface of the vibrating body. The wear amount of the compound resin sliding surface was also measured. The degrees of the wear were classified as large, medium, small and mixtures thereof.

Torque fluctuations : The torque fluctuations when driving for 20 minutes by the rating were measured using a low-speed type torque detector (made by ONO SOKKI Co., Ltd.).

The results were classified as ○, Δ according to the amount of fluctuations.

Output rating, maximum efficiency:

The torque output and the motor characteristics of torque vs. efficiency were measured using the low-speed type torque detector mentioned above. The output and the maximum efficiency under the rated torque (4 kg/cm) were found and the results were classified as ●, ○ and Δ.

The materials of vibrating bodies in Chart 2, by the way, were all martensite stainless steels. Though it was understood that said the steel had high corrosion resistance, a test was conducted by assembling the same steel into a motor in order to verify its capability of corrosion resistance.

The test conditions were a heat cycle test wherein a motor was driven 3 times in the environments of both the temperature 60° C. and −30° C. with the uniform humidity of 60%. On completion of the cycle test, the motor was left for a while and then was disassembled to observe the friction surface of the vibrating body.

The result showed that rust in a very small degree was noticed on the 13% chrome steel while there were no special problems noted for the 17% chrome stainless steel of precipitation hardening type.

Since it was contemplated that rust of iron oxide on the friction surface of the vibrating body would facilitate the frictional wear of the friction surface of the vibrating body or the sliding surface of the compound resin sliding body, it was verified that the 13% chrome steel could well satisfy the operational conditions though it was less expensive than the 17% chrome steel.

Initial wear

The results of initial wear in Chart 3 show that the greater hardness of the friction surface of the vibrating body as seen with the tungsten carbide and cobalt in the comparative case 2, can naturally eliminate a need for consideration to be paid to the initial wear of the vibrating body. Selecting the counterpart material in order to establish a proper compound resin was rather a matter of primary importance in this case. It was found that a combination of the compound resin of non-fiber type thermosetting polyimide in the Embodiment 1 gave good results besides the extra-high strength compound resin as described in the comparative case wherein the conventional thermosetting polyimide was used, but with the additional filling of carbon fiber.

In the case where the friction surface of a vibrating body adopted was not processed by heat treatment of the 13% chrome, which was mentioned in the comparative case 1 (shown in Chart 3), the initial wear of both the vibrating body and the sliding body was detected not only with the compound resin filled with carbon fiber explained in the comparative case, but also with the non fiber type compound resin in both Embodiments of 1 (Chart 3) and 2 (Chart 3).

Though combining the polyimide compound resin described in the comparative case was still not suitable for use for the vibrating body of precipitation hardening type stainless steel shown combination with the non-fiber type compound resin in the Embodiments 1 and 2 could be used with no problem of the initial wear for both the vibrating body and the sliding body. It was further found feasible for a sliding body to use the combination with the non-fiber type compound resin in the Embodiments 3 and 4.

Since the vibrating body using the 13% chrome steel processed by heat treatment as explained in the Embodiment 1 (refer to Chart 3) had a higher hardness than the stainless steel of precipitation hardening type explained in the Embodiment 2 (refer to Chart 3) and 3 (refer to Chart 3), the initial wear of the vibrating body made some improvements. Accordingly, it was found that the compound resin in the Embodiments 1 (refer to Chart 1) and 4 (refer to Chart 1) could be used with no problems. It was also found that there was a possibility of using the compound resin in the Embodiments 2 (refer to Chart 1) and 3 (refer to Chart 1).

Torque fluctuations

Concerning the torque fluctuations, considering the results obtained for the case, wherein the vibrating body of the comparative case 2 was used and the compound resin constituting the material for the sliding body of both the comparative case and the Embodiment 1 was used, the torque fluctuations for the thermosetting polyimide resin filled with carbon fiber was around 5% and was evaluated by "Δ". The same thermosetting polyimide, on the other hand, when mixed with the non fiber fillers such as the tetrafluoric ethylene resin or the lead carbonate and formed into the compound resin, showed a considerable improvement of around 2% in the torque fluctuations and was evaluated by ◯.

The evaluation of "◯" was likewise given to the case where the vibrating body of the Embodiments 1, 2 and 3 was used, and the compound resin of the Embodiments 1, 2 and 3 was used.

As the metal molybdenum powder of the minute grain size smaller than 5 μm was dispersed and filled in the thermosetting resin having higher material strength in the case of the compound resin in the Embodiment 2, it was understood that the conditions of the friction surface were made uniform and the stable frictional driving in this case was made possible.

Moreover, with the case of the Embodiment 4 (refer to Chart 1), a powder of calcium carbonate having lower strength or hardness than the metal molybdenum was dispersed and filled in the thermoplastic polyimide having a relatively lower strength than the thermosetting polyimide. It is presumed that a stable friction drive was made possible in this case because of the uniform conditions of the sliding surface. From the point of the uniformity of the surface conditions, the case would be either that the hardness of the spherical graphite might have been too hard, or that the 10 μm grain size of the spherical graphite might have been too big for the compound resin described in the Embodiment 3. Consequently, it was considered necessary to improve the hardness of the resin materials by annealing and further transposing for better crystallization, or to use spherical graphite of still smaller grain sizes for filling and mixing.

Output rating, maximum efficiency

When a vibrating body and a compound resin material were evaluated in relation to the output rating or the maximum efficiency of a motor, it was verified for the friction surface of the vibrating body that if the solution-treated material of the precipitation hardening type stainless steel (Embodiment 2) was used in place of the thermally sprayed surface of tungsten carbide and cobalt (the comparative case 2), a slight decrease (about 5% at maximum) in the motor performance including the output rating or the maximum efficiency was detected.

This decrease was presumably associated with the drop in the friction coefficient between the friction surface of the vibrating body and the sliding surface of the compound resin.

When the motor performance was compared from the point of sliding bodies of compound resins, the highest performance was exhibited by the Embodiment 3 wherein the tetrafluoric ethylene resin as the abrasion adjusting agent and the spherical graphite as the abrasion improvement agent were filled and mixed in the thermoplastic polyimide. It was assumed that this superior performance was attributable to the high thermal conduction along with the material of high quality used (hardness of example).

The present invention is composed of the compound resin layers of a sliding body that are made up of the non-fiber type compound resin (the compound resin containing non-fiber as a filler) having the Rockwell hardness ($H_RM$) 80 or 110, preferably 80–95, and the friction surface of a vibrating body that is made of the stainless steel of precipitation hardening type having the Rockwell hardness ($H_RC$) 35 or 44. The configuration thus constituted not only can improve the torque fluctuations when large output is generates, but also prevents flaw on the friction surface of a vibrating body. Further, the frictional wear on both the friction surface of a vibrating body and the sliding surface of compound resin can be held to a minimum.

In addition, as it is no longer necessary to conduct thermal spraying of tungsten carbide and cobalt over the friction surface for a vibrating body, a drastic cost reduction as well as better mass productivity becomes possible.

CHAERT 1

| | MATRIX RESIN | FILLERS (wt %) ABRASION ADJUSTING AGENT | FILLERS (wt %) ABRASION IMPROVEMENT AGENT | TRANSITION POINT TO GLASS (°C.) | ELASTIC MODULUS OF BENDING (kg/cm2) | ROCKWELL HARDNESS HRM |
|---|---|---|---|---|---|---|
| COMPARATIVE CASES | THERMOSETTING P1 | NOT APPLICABLE | CF (15) | NOT APPLICABLE | 80,000 | 109 |
| EMBODIMENT | | | | | | |
| 1 | THERMOSETTING P1 | PTFE (8.5) PbO (6.0) | NOT APPLICABLE | NOT APPLICABLE | 22,700 | 104 |
| 2 | | PTFE (9.4) | Mo (6.5) | NOT APPLICABLE | 37,900 | 107 |
| 3 | THERMOPLASTIC P1 | PTFE (3.0) | SPHERICAL GRP (12) | 250 | 40,000 | 83 |
| 4 | | PTFE (7.0) | CaCO3 (10) | | | 86 |

CHART 3

| VIBRATING BODY | COMPOUND RESIN | INITIAL WEAR VIBRATING BODY | INITIAL WEAR COMPOUND RESIN | TORQUE FLUCTUATIONS | RATED OUTPUT | MAXIMUM EFFICIENCY |
|---|---|---|---|---|---|---|
| COMPARATIVE CASE NO. 1 (SUS420J2) | COMPARATIVE CASE | LARGE | LARGE | — | — | — |
| | EMBODIMENT NO. 1 | SMALL | MEDIUM | — | — | — |
| | EMBODIMENT NO. 2 | MEDIUM | SMALL | — | — | — |
| COMPARATIVE CASE NO. 2 (wc/co) | COMPARATIVE CASE | NONE | MINUTE | ∆ | ● | ○ |
| | EMBODIMENT NO. 1 | NONE | MINUTE | ○ | ○ | ○ |
| | EMBODIMENT NO. 2 | MINUTE | SMALL | — | ○ | ○ |
| | EMBODIMENT NO. 3 | MINUTE | MEDIUM | — | ● | ● |
| | EMBODIMENT NO. 4 | MINUTE | MEDIUM | — | ○ | ○ |
| EMBODIMENT NO. 1 (SUS420 HEAT TREATED) | COMPARATIVE CASE | SMALL | SMALL | — | — | — |
| | EMBODIMENT NO. 1 | NONE | NONE | ○ | ∆ | ∆ |
| | EMBODIMENT NO. 2 | MINUTE | SMALL | ○ | ○ | ○ |
| | EMBODIMENT NO. 3 | MINUTE | SMALL | ∆ | ○ | ● |
| | EMBODIMENT NO. 4 | NONE | MINUTE | ○ | ○ | ○ |
| EMBODIMENT NO. 2 (PSL-A) | COMPARATIVE CASE | MEDIUM | MEDIUM | — | — | — |
| | EMBODIMENT NO. 1 | NONE | NONE | ○ | ∆ | ∆ |
| | EMBODIMENT NO. 2 | MINUTE | MINUTE | ○ | ∆ | ○ |
| | EMBODIMENT NO. 3 | MINUTE | SMALL | ∆ | ∆ | ○ |
| | EMBODIMENT NO. 4 | MINUTE | MEDIUM | ∆ | X | ∆ |
| EMBODIMENT NO. 3 (PSL-H900) | COMPARATIVE CASE | MEDIUM | MEDIUM | — | — | — |
| | EMBODIMENT NO. 1 | NONE | NONE | ○ | ∆ | ∆ |
| | EMBODIMENT NO. 2 | MINUTE | MINUTE | ○ | ∆ | ○ |
| | EMBODIMENT NO. 3 | MINUTE | SMALL | ∆ | ∆ | ○ |
| | EMBODIMENT NO. 4 | MINUTE | SMALL | ○ | ∆ | ∆ |

What is claimed is:

1. A vibration wave driven motor comprising:
a vibration member for generating a vibration wave in response to an applied signal; and
a contact member having a contact surface which contacts the vibration member, said vibration wave creating relative movement between said vibration member and said contact member, the contact surface of said contact member being made of a non-fiber type compound resin having an M-type Rockwell hardness of 80–110 and said vibration member being made of a stainless steel having a C-type Rockwell hardness ($H_RC$) of 35–44.

2. A vibration wave driven motor according to claim 1, wherein the vibrating body is made of a stainless steel of precipitation hardening type having a maximum C-type Rockwell hardness ($H_RC$) of 38 processed by solution treatment.

3. A vibration wave driven motor according to claim 1, wherein the compound resin is made of a matrix resin of a thermosetting aromatic polyimide type.

4. A vibration wave driven motor according to claim 1, wherein the compound resin is made of a thermoplastic resin, and wherein the matrix resin has a transition point to glass higher than 100° C.

5. A vibration wave driven motor according to claim 1, wherein said non-fiber type compound resin includes a thermosetting matrix resin and a non-fiber type friction lubrication agent.

6. A vibration wave driven motor according to claim 5, wherein said thermosetting matrix resin is made of polyimide.

7. A vibration wave driven motor according to claim 5, wherein said friction lubrication agent includes tetrafluoric ethylene resin.

8. A vibration wave driven motor according to claim 5, wherein said friction lubrication agent includes tetrafluoric resin and lead-monoxide lead powder.

9. A vibration wave driven motor according to claim 1, wherein said non-fiber type compound resin includes a thermoplastic matrix resin and a non-fiber type friction lubrication agent.

10. A vibration wave driven actuator, comprising:
a vibration member for generating a vibration wave in response to an applied signal; and
a contact member having a contact surface which contacts the vibration member, wherein said vibration wave creates relative movement between sad vibration member and said contact member, the contact surface of said contact member being made of a compound resin including a thermoplastic matrix resin having a transition temperature to glass greater than 100° C. and a non-fiber type friction lubrication agent, said compound resin having an M-type Rockwell hardness of 80–110, and said vibration member being made of a stainless steel having a C-type Rockwell hardness of 35–44.

* * * * *

UNITED STATES PATENT AND TRADEMARK OFFICE
CERTIFICATE OF CORRECTION

PATENT NO. : 5,148,075

DATED : September 15, 1992

INVENTOR(S) : Shirasaki

It is certified that error appears in the above-identified patent and that said Letters Patent is hereby corrected as shown below:

COLUMN 1

Line 9, "impressing" should be deleted.
    Line 17, "type" should read --type,--.

COLUMN 2

Line 36, "wore" should be deleted.
    Line 50, "aspect" should read --aspects--.
    Line 53, "In" should read --In one--, and "this," should read --this--.

COLUMN 4

Line 21, "of" should be deleted.
    Line 42, "risins" should read --resins--.

COLUMN 5

Line 7, "of" (third occurrence) should be deleted.

COLUMN 6

Line 19, "disc from," should read --disc, from--.
    Line 50, "Further" should read --Further,--.
    Line 63, "FIG. 1" should read --FIG. 1,--.

UNITED STATES PATENT AND TRADEMARK OFFICE
CERTIFICATE OF CORRECTION

PATENT NO. : 5,148,075

DATED : September 15, 1992

INVENTOR(S) : Shirasaki

It is certified that error appears in the above-identified patent and that said Letters Patent is hereby corrected as shown below:

COLUMN 7

Line 24, "off set" should read --offset--.

COLUMN 10

Line 53, "non fiber" should read --non-fiber--.
Line 58, "shown combination" should read
--shown in the Embodiments 2 and 3, it was found
that the combination--

COLUMN 11

Line 19, "non" should read should read --non- --.

COLUMN 12

Line 39, "generates," should read --generated,--.
Line 51, "CHAERT 1" should read --CHART 1--.

UNITED STATES PATENT AND TRADEMARK OFFICE
CERTIFICATE OF CORRECTION

PATENT NO. : 5,148,075

DATED : September 15, 1992

INVENTOR(S) : Shirasaki

Page 3 of 3

It is certified that error appears in the above-identified patent and that said Letters Patent is hereby corrected as shown below:

Line 68, at bottom of Column 12, insert Chart 2, as follows:

--

CHART 2

|  |  | MARTENSITE STAINLESS STEEL | HEAT TREATMENT | THERMAL SPRAYING OF THE FRICTION SURFACE | HARDNESS Hv (HRC) | REMARKS |
|---|---|---|---|---|---|---|
| COMPARATIVE CASES | 1 | 13% Cr (SUS420J2) | NOT APPLICABLE | NOT APPLICABLE | 220 (18) |  |
|  | 2 |  | ANNEALING/TEMPERING (1020°C/200°C) | WC + Co (12% wt) | more than 1000 |  |
| EMBODIMENT | 1 | 17% Cr (SUS630) | ANNEALING/TEMPERING (1020°C/200°C) | NOT APPLICABLE | 530 (51) |  |
|  | 2 |  | NOT APPLICABLE | NOT APPLICABLE | 380 (39) | SUPERIOR CORROSION RESISTANCE AND MIRROR FINISH |
|  | 3 | MATERIAL TO BE PROCESSED BY SOLUTION TREATMENT | HEAT TREATMENT OF PRECIPITATION HARDENING (H900) | NOT APPLICABLE | 420 (43) |  |

--

Signed and Sealed this

Second Day of March, 1993

*Attest:*

STEPHEN G. KUNIN

*Attesting Officer*    *Acting Commissioner of Patents and Trademarks*